United States Patent Office 3,655,674
Patented Apr. 11, 1972

3,655,674
3-[2-(4-CYCLOHEXANECARBOXAMIDO-1-PIPERIDYL)ETHYL]INDOLE
John Leheup Archibald, Windsor, England, assignor to John Wyeth & Brother Limited, Maidenhead, England
No Drawing. Filed July 23, 1969, Ser. No. 844,188
Claims priority, application Great Britain, July 24, 1968, 35,231/68
Int. Cl. C07d 29/30
U.S. Cl. 260—293.61                    1 Claim

ABSTRACT OF THE DISCLOSURE

The invention relates to the field of substituted indoles, in particular to indol-3-yl-lower alkylpiperidines substituted in the piperidine ring by a cycloalkanoylamino residue, their acid addition and quaternary ammonium salts, and to intermediates and processes for the preparation thereof. The compounds of the invention are pharmacologically efficacious as hypotensive and anti-histamine agents.

This invention relates to indole derivatives, to processes for the preparation thereof and to pharmaceutical compositions containing such derivatives, and is an improvement in or modification of our co-pending application No. 24,256/67.

Our co-pending application No. 24,256/67 provides compounds of the general formula (I)

in which formula represents a ring system of the general formula

II(a)     II(b)     (IIc)

$R^1$ represents hydrogen, lower alkyl, lower aralkyl or aroyl; $R^2$ represents hydrogen, lower alkyl or aryl; $R^3$ represents hydrogen, halogen, lower alkoxy, hydroxy or lower alkyl; $R^4$ represents hydrogen, halogen or lower alkyl; $R^5$ represents aryl (including heterocyclic aryl), lower alkoxy, aryloxy, lower aralkyl, lower aralkyloxy or diaryllower alkyl; $X^\ominus$ is an anion; A represents a lower alkylene or mono- or di-ketolower alkylene radical containing up to 4 carbon atoms; and Z is an oxo (i.e.=O) group with the proviso that Z in Formula II(c) may also represent two hydrogen atoms when A is lower alkalene and $R^5$ is aryl.

As a modification of the invention claimed in co-pending application No. 24,256/67, we have now found that if the radical—$CZR^5$ in compounds of general Formula I is replaced by a cycloalkylcarbonyl radical, then the compounds formed still have pharmacological activity, e.g. hypotensive activity but more particularly high anti-histamine activity. The compounds are also intermediates in the preparation of similar compounds.

The present invention provides compounds of the general formula (III)

in which formula is a ring system of the general formula

IV(a)     IV(b)

or

IV(c)

in which $R^1$, $R^2$, $R^3$, $R^4$ $X^\ominus$ and A have the meanings defined above and $R^5$ is a cycloalkyl radical containing 5 to 7 carbon atoms, preferably a cyclohexyl radical.

Preferred radicals for $R^1$, $R^2$, $R^3$, $R^4$ and A are the same as the preferred radicals listed in co-pending application No. 729,377 and examples of such preferred radicals are hydrogen, methyl and benzyl for $R^1$, hydrogen and methyl for $R^2$, hydrogen and methoxy for $R^3$, hydrogen for $R^4$ and ethylene for A. The compounds of general Formula III can be prepared following the procedures described in said co-pending application, i.e. as follows:

A first method of preparation comprises reacting a compound of the general formula (V)

with a compound of the general formula

VI(a)     VI(b)     VI(c)

(where $R^1$, $R^2$, $R^3$, $R^4$, $R^5$ and A have the meaning defined above in connection with Formula III and Y is a halogen atom or an equivalent radical, e.g. an organic sulphonyl radical such as a tosyl radical) and if necessary reducing the compound obtained when the nitrogen containing ring is unsaturated.

A second method of preparation comprises acylating a compound of the general formula (VII)

(in which

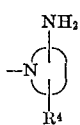

is a ring system of the formula

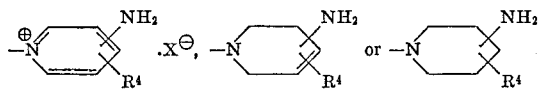

and $R^1$, $R^2$, $R^3$, $R^4$, X and A have the meanings defined above), with a reactive derivative of a cycloalkylcarboxylic acid, e.g. with the chloride or anhydride.

A third method of preparation comprises reducing the corresponding compounds containing an unsaturated nitrogen ring, i.e. the pyridinium or tetrahydropyridinium compounds of the general Formula III can be selectively reduced to give compounds in a lower oxidation state. For example, the pyridinium compounds can be reduced with an alkali metal borohydride to the tetrahydropyridinium compounds, which may be reduced further (e.g. with hydrogen in the presence of a hydrogenation catalyst) to give the piperidine compounds. Alternatively, the pyridine compounds can be reduced directly (e.g. with hydrogen in the presence of a catalyst) to give the piperidine compounds.

The tetrahydropyridine and piperidine compounds can be obtained by carrying out a Fischer indole synthesis on a compound of the general formula

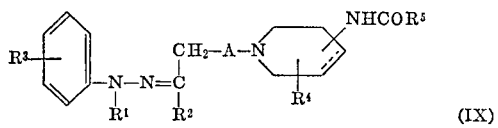

in which $R^1$, $R^2$, $R^3$, $R^4$, $R^5$ and A have the meanings defined in connection with Formula III and the broken line indicates that the double bond is optional.

Further details of the above general methods of preparation are given in our co-pending application No. 729,377. The reactants employed in these reactions either are known compounds, which are commercially available or can be prepared by methods known in the art, or are derivatives thereof which can be prepared by well known chemical procedures from appropriate starting materials following the methods described in the art for the known compounds, and reference may be had to our co-pending application No. 729,377.

Furthermore, once a compound of general Formula III in which $R^1$ is a hydrogen atom, has been prepared derivatives thereof may be prepared by alkylation, aralkylation or aroylation at the 1-position. For example, an alkali metal salt, e.g. the sodium salt can be prepared and reacted with an alkyl or aralkyl halide or with an aroylating agent.

Since the novel tetrahydropyridine and piperidine compounds of general Formula III contain a basic nitrogen atom they can form acid addition salts with acids (e.g. hydrochloric acid) or quaternary ammonium salts with alkyl halides (e.g. methyl bromide or chloride) and the invention also provides such salts.

The invention further provides a pharmaceutical composition comprising a compound of general Formula III or a non-toxic acid addition or quaternary ammonium salt thereof and a pharmaceutically acceptable carrier. The carrier may be solid or liquid and any suitable carrier known in the art may be used. The composition may be made up in the form of a solution, tablet, capsule or cream.

In the pharmacological evaluation of the properties of the compounds of this invention, the effects in vivo and in vitro were measured as follows:

(a) The hypotensive activity was measured by anaesthetising a rat and recording the blood pressure, heart rate and respiration. Blood pressure responses to the injection of known agonist drugs, viz., noradrenaline (0.5 µg.), acetylcholine (0.05 µg.), isoprenaline (0.025 µg.) and angiotensin (0.05 µg.) were recorded before and after administration of each dose of one of the test compounds; the test compounds being injected intravenously in doses of 5.0, 10.0 and 20.0 mg./kg. approximately 30 minutes apart.

(b) Anti-histamine activity was measured as follows: Segments of guinea pig ileum were suspended in a 10 ml. bath containing Kreb's solution at 38° C. Activity of the ileum was recorded by means of attachment to an isotonic frontal writing lever which exerts 1–2 grams tension and amplifies contractions which are recorded on a smoked kymograph drum. The $ED_{50}$ of each compound against histamine may be assayed by obtaining contractions to a set dose of histamine then challenging with varying doses of the test compound.

When the compounds of this invention are employed as anti-histamine agents they may be administered to warm blooded animals, e.g. mice, rats, rabbits, dogs, cats or monkeys alone or in combination with pharmaceutically acceptable carriers, the proportion of which is determined by the solubility and chemical nature of the compounds, chosen route of administration and standard biological practice. For example, they may be administered orally in the form containing such excipients for example starch, milk or sugar, e.g. as tablets or capsules. They may also be administered orally in the form of solutions or they may be injected as solutions. For intraperitoneal administration they may be used in the form of sterile solutions or suspensions containing other solutes for example enough saline or glucose to make the solution isotonic.

The dosage of the present compounds will vary with the mode of administration and the particular compound chosen. Furthermore, it will vary with the particular subject under treatment. Generally, treatment is initiated with doses substantially less than the optimum dose of the compound. Thereafter, the dosage may be increased by small amounts until the optimum effect under the circumstances is reached. In general, the compounds of this invention are most desirably administered at a concentration level that will generally afford effective results without causing any harmful or deleterious side effects.

The following non-limiting examples illustrate the invention:

EXAMPLE 1

3-[2-(4-cyclohexanecarboxamido-1-piperidyl) ethyl]-indole (a) 4-cyclohexanecarboxamidopiperidine hydrochloride (2.47 g.) and potassium carbonate (4.14 g.) in isopropanol (50 ml.) were refluxed for 1 hour, then 3-(2-bromoethyl)indole (2.24 g.) in isopropanol (20 ml.) was added while stirring. Refluxing and stirring were continued for 18 hours, the solution was filtered while hot and water was added to the filtrate to induce crystallisation and give the title compound, M.P. 182–4° C.

Analysis.—Found (percent): C, 74.9; H, 8.9; N, 11.9. $C_{22}H_{31}N_3O$ requires (percent): C, 74.75; H, 8.8; N, 11.9.

(b) The starting material for this example was prepared by drastic reduction of 4-benzamido pyridine (itself obtained from 4-aminopyridine and benzoyl chloride) using hydrogen in the presence of a platinum hydrogenation catalyst.

EXAMPLE 2

Following the procedure of Example 1, but replacing the 3-(2-bromoethyl) indole by 3-(2-bromoethyl)-2-methylindole yields 3-[2-(4-cyclohexanecarboxamido-1-piperidyl)ethyl]-2-methylindole.

EXAMPLE 3

Following the procedure of Example 1 but replacing the 3-(2-bromoethyl)indole by 3-(2-bromoethyl)-5-methoxy-2-methylindole yields 3-[2-(4-cyclohexanecarboxamido-1-piperidyl)ethyl]-5-methoxy-2-methylindole.

The starting materials used in this example can be prepared as described in our co-pending application No. 35,230/68.

EXAMPLE 4

3-[2-(4-cyclopentanecarboxamido - 1 - piperidyl)ethyl] indole can be prepared by acylating 3-[2-(4-amino-1-piperidyl)ethyl]indole (which may be prepared as described in our co-pending application No. 729,377) with cyclopentane carbonyl chloride.

EXAMPLE 5

3-[2-(4-cycloheptanecarboxamido - 1 - piperidyl)ethyl] indole can be prepared by acylating 3-[2-(4-amino-1-piperidyl)ethyl]indole with cycloheptane carbonyl chloride.

EXAMPLE 6

The product of Example 1(a) can be reacted with sodium in liquid ammonia, and then methyl iodide added slowly to give 3-[2-(4-cyclohexanecarboxamido-1-piperidyl)ethyl]-1-methylindole.

EXAMPLE 7

The methyl iodide in Example 6 can be replaced by benzyl chloride to give 3-[2-(4-cyclohexanecarboxamido-1-piperidyl)ethyl]-1-benzylindole.

EXAMPLE 8

The methyl iodide in Example 6 can be replaced by benzoyl chloride to give 3-[2-(4-cyclohexanecarboxamido-1-piperidyl)ethyl]-1-benzoylindole.

EXAMPLE 9

3-[2-(4-cyclohexanecarboxamido-1-piperidyl)ethyl]-2-phenylindole

Phenylhydrazine and 4-cyclohexanecarboxamido-1-(4-oxo-4-phenylbutyl)-piperidine were reacted to give the corresponding phenylhydrazine which was subjected to a Fischer indole reaction to give the title compound.

EXAMPLE 10

3-[2-(4-cyclohexanecarboxamido-1-piperidyl)ethyl]-5-bromoindole 5-bromo-indol-3-ylacetic acid was reduced with aluminium lithium hydride to give 2-(5-bromo-indol-3-yl) ethyl alcohol, which was brominated and then reacted with 4-cyclohexanecarboxamidopiperidine to give the title compound.

EXAMPLE 11

3-[2-(4-cyclohexanecarboxamido-1-piperidyl)ethyl]-5-methylindole

The 5-bromo-indol-3-ylacetic acid of Example 10 was replaced by 5-methylindol-3-ylacetic acid to give the title compound.

EXAMPLE 12

3-[2-(4-cyclohexanecarboxamido-1-piperidyl)ethyl]-5-hydroxyindole 5-benzyloxyindole was treated with oxalylchloride to give 5-benzyloxyindol-3-ylglyoxyloyl chloride. Subsequent reaction with ethyl alcohol and then reduction gave 2-(5-benzyloxy-indol-3-yl)ethyl alcohol. Bromination and then reaction with 4-cyclohexanecarboxamidopiperidine gave the 5-O-benzyl derivative of the title compound which was hydrogenolysed to the title compound.

EXAMPLE 13

3-[2-(4-cyclohexanecarboxamido-3-methyl-1-piperidyl) ethyl]-2-methylindole 3-(2-bromoethyl)-2-methylindole in ethanol was heated under reflux for 6 hours with 4-cyclohexanecarboxamido-3-methylpyridine. The 4-cyclohexanecarboxamido-3-methyl-1-[2-(2-methylindol - 3 - yl)ethyl]pyridinium bromide which separated was hydrogenated over W7 Raney nickel in ethyl alcohol containing triethylamine to give the title compound.

When 3-[2-(4-cyclohexanecarboxamido - 1 - piperidyl) ethyl]indole was tested for anti-histamine activity by the procedure outlined in column 4, it showed a 50% reduction in the response to histamine at a dose of $5 \times 10^{-7}$ μg./ml. and a 100% reduction at $5 \times 10^{-5}$ μg./ml.

What is claimed is:

1. 3-[2-(4-cyclohexanecarboxamido - 1 - piperidyl)ethyl]indole.

References Cited

UNITED STATES PATENTS 3,238,215  3/1966  Zenitz _____ 260—293

HENRY R. JILES, Primary Examiner

G. T. TODD, Assistant Examiner

U.S. Cl. X.R.

260—293.76, 295 B, 295 H, 296 B, 326.1, 326.16; 424—263, 267